Dec. 9, 1952   R. W. DRAKE   2,620,770
AUTOMATIC WATERING SYSTEM
Filed Sept. 21, 1950   2 SHEETS—SHEET 1

Ralph W. Drake
INVENTOR.

BY
Attorneys

Dec. 9, 1952      R. W. DRAKE      2,620,770
AUTOMATIC WATERING SYSTEM
Filed Sept. 21, 1950      2 SHEETS—SHEET 2
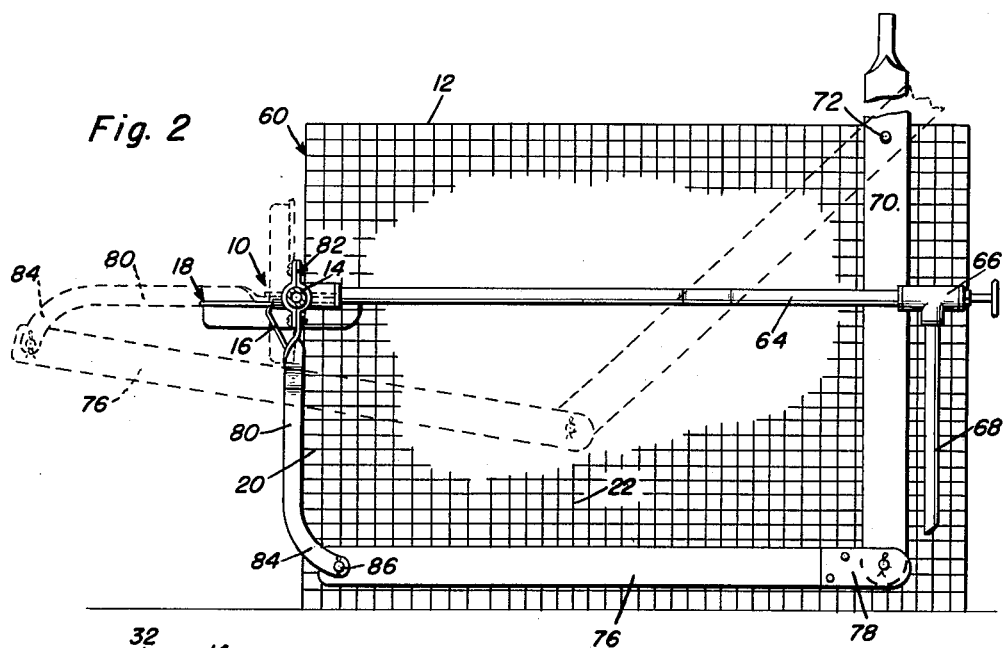
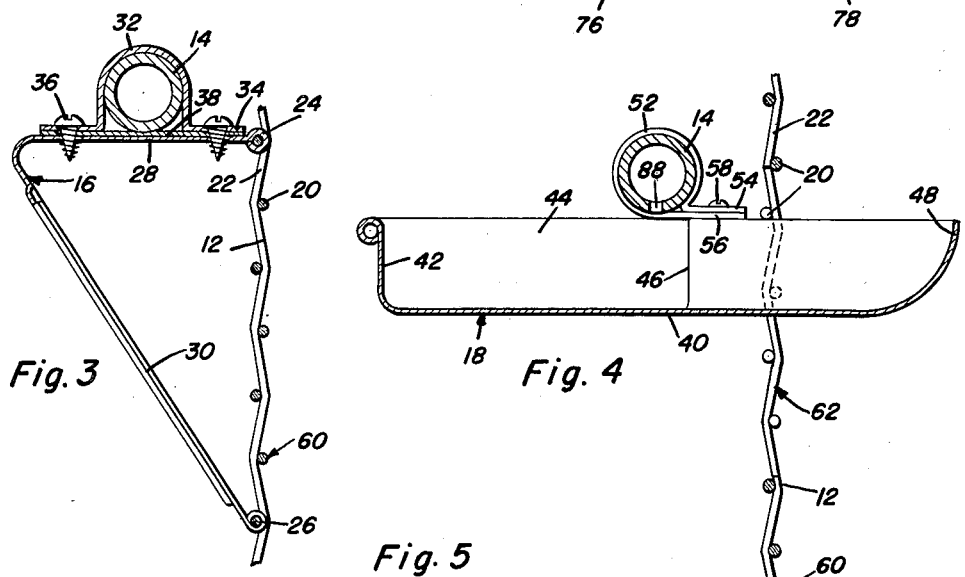
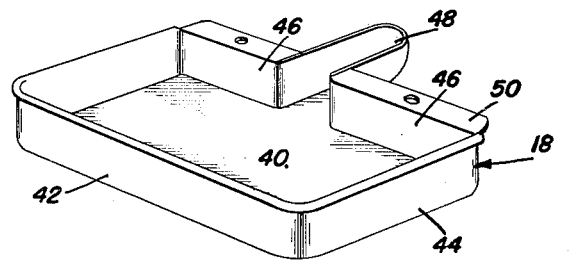
Ralph W. Drake
INVENTOR.

Patented Dec. 9, 1952

2,620,770

UNITED STATES PATENT OFFICE 2,620,770

AUTOMATIC WATERING SYSTEM

Ralph W. Drake, Bremerton, Wash.

Application September 21, 1950, Serial No. 186,053

6 Claims. (Cl. 119—18)

This invention comprises novel and useful improvements in automatic watering systems, and more particularly pertains to a system in which a plurality of spaced troughs may be selectively filled, emptied, and flushed from a single remote point.

An important object of this invention is to provide an automatic watering system in which a plurality of troughs can be selectively manipulated to be filled, emptied, or flushed out from a point remote from the trough.

Another object of this invention is to provide a watering trough system, in accordance with the foregoing object, in which the watering troughs are positioned in close proximity to an animal pen, so as to be accessible to animals contained therein.

Still another object of this invention is to provide a watering trough system, in accordance with the foregoing objects, in which the watering trough can be selectively moved into its trough emptying position without discharging the contents of the trough into the pen.

An important feature of this invention resides in the provision of a watering system including a horizontally disposed conduit, and a watering trough carried by the conduit, with means rotatably mounting the conduit on a pen so that the conduit and trough may be rotated to empty the trough and/or flush the trough out.

Another feature of this invention resides in the provision of a watering system, in accordance with the foregoing feature, in which the watering trough has a laterally projecting cup portion on the rear end thereof, which cup portion projects into an aperture in one wall of the pen so that the contents of the trough are accessible to animals contained therein.

Still another feature of this invention resides in the provision of a watering system, in accordance with the foregoing features, together with a means for supporting the trough in its horizontal position.

These, together with various ancillary objects and features, are attained by this device, a preferred embodiment of which has been illustrated by way of example only in the accompanying drawings wherein:

Figure 2 is a side elevational view of the animal pen with the watering trough mounted thereon, the dotted lines showing the trough moved to its discharging position;

Figure 3 is an enlarged fragmentary vertical sectional view taken substantially on the plane 3—3 of Figure 1;

Figure 4 is an enlarged fragmentary vertical sectional view of the watering trough taken substantially on the plane 4—4 of Figure 1; and Figure 5 is an enlarged perspective elevational view of the watering trough.

Figure 1:
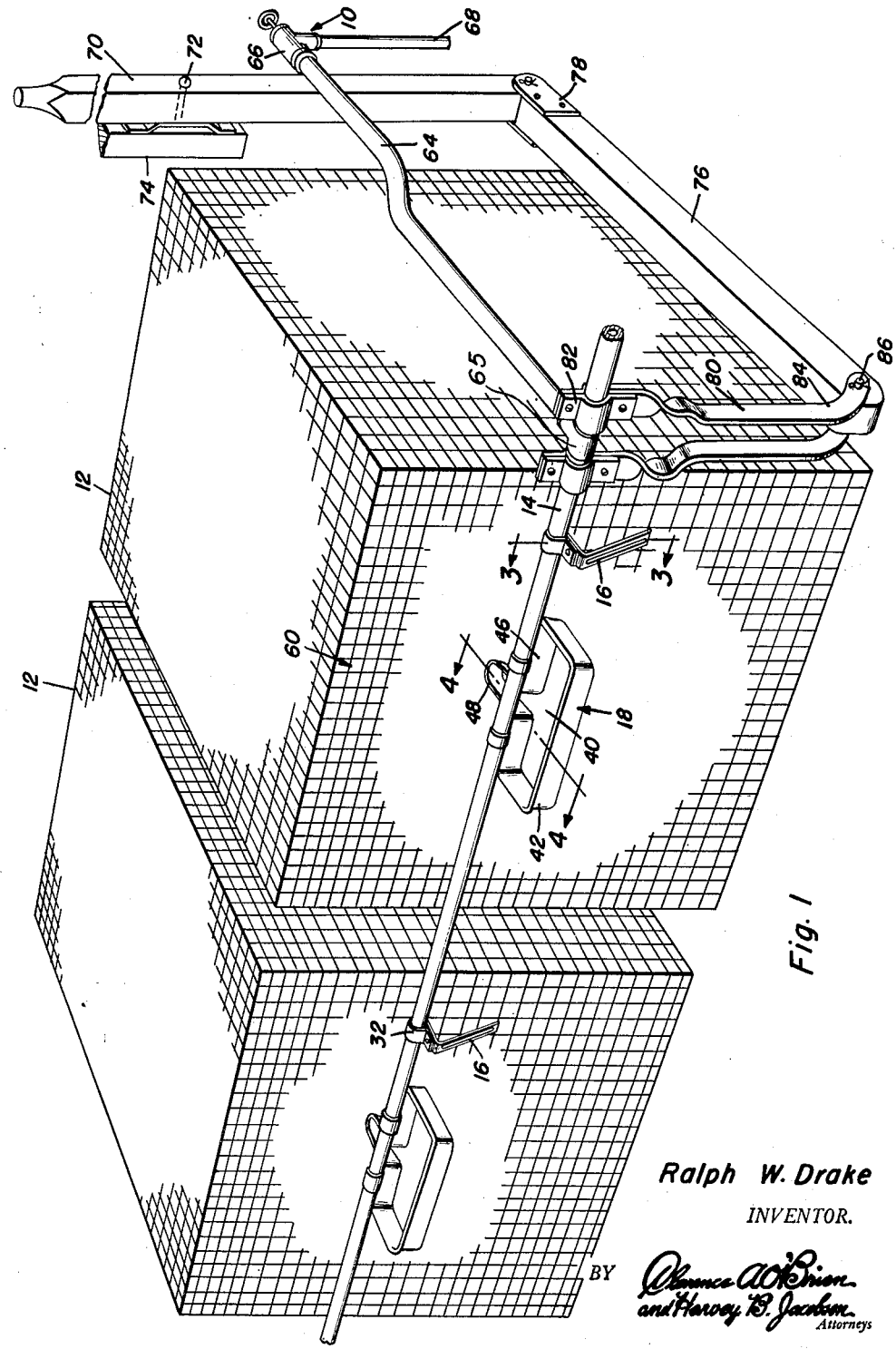
Figure 1 is a perspective elevational view of a set of animal pens having the watering system mounted thereon.

Reference is now made more specifically to the accompanying drawings wherein like numerals designate similar parts throughout the various views, and in which there is shown the watering system indicated generally by the numeral 10 mounted on animal pens 12 so that a plurality of troughs may be simultaneously filled, emptied, or flushed out by manipulation of remotely positioned controls.

In order to properly care for such animals as mink and the like, it is necessary to clean and refill the watering trough for the mink a number of times each day. Since mink and the like carry food to the watering trough, when they are drinking, which food forms a sedimentary deposit on the bottom of the trough, and further since algae collects in the pans very rapidly, particularly in warm weather, it is necessary to clean the troughs each time they are filled. In the past, the pans have been detachably secured to the pens in such a manner that they may be removed therefrom to be brushed and rinsed prior to refilling. Because of the number of troughs involved, and because of the number of times each day this operation must be repeated, it is obviously desirable to provide a device in which a plurality of troughs may be filled, emptied and rinsed from a remote point, without requiring individual handling of each trough.

For this purpose there has been provided a horizontally disposed fluid conduit 14 which is rotatably mounted by brackets 16 on the animal pen 12, which conduit non-rotatably carries the watering trough 18.

As the pens 12 are customarily formed of interwoven mutually perpendicular wires such as 20 and 22, it is intended that the brackets 16 be provided with clamping knuckles such as 24 and 26 on the free ends of the horizontally disposed conduit supporting legs 28 and the brace arms 30 respectively. The conduit 14 is rotatably mounted upon the legs 28 by means of a substantially U-shaped clamp 32 having outwardly extending finger portions 34 which are secured to the leg 28 by means of fasteners 36. As is apparent, a suitable bearing plate 38 may be positioned so as to underlie the conduit 14, which bearing plate may conveniently be secured to the leg 28 by means of the same fasteners 36.

The trough 18 includes a bottom wall 40 having front and side walls 42 and 44 respectively and a rear wall 46. A cup-shaped portion 48 extends laterally of the trough 18 and communicates therewith by means of an aperture in the rear wall 46 thereof, and a rearwardly extending flange 50 is preferably formed integrally with the rear wall 46, and is secured to the cup portion 48, as by welding or the like.

The trough 18 is non-rotatably secured to the conduit 14 by means of a strap 52 which is disposed about the conduit 14, the free ends 54 and 56 of which conduit are secured to each other, and to the flange 50 by means of fasteners 58. It is intended that the cup portion 48 of the trough 18 extend into the pen 12, the main portion of the trough being positioned externally thereof so that animals positioned within the pen may not bodily enter the trough, and for this purpose the front wall 60 is apertured as at 62 to permit the cup portion to swing about the axis of the conduit 14, into and out of the pen 12. In order to retain the trough 18 in a substantially horizontal position, it is thought apparent that one of the horizontally disposed wires 20 be so positioned that it contacts the upper edge of the cup portion 48 to limit vertical swinging movement of the trough 18. The conduit 14 is rotatably connected to a supply line 64 by a suitable connector 65, the supply line 64 communicating, by means of a valve 66 and a pipe 68 to a source of fluid pressure (not shown).

In order to selectively rotate the conduit 14, and consequently the trough 18, there is provided an actuating lever 70 which is pivoted by means of a pin 72 to a support 74, the lower end of which rod is pivotally attached to a connecting link 76 having bearing plates 78 thereon. A pair of arms 80 are non-rotatably clamped to the conduit 14 as by brackets 82, and which arms are provided with laterally offset extensions 84 which extend rearwardly, and which extensions are pivotally connected by means of a pin 86 to the connecting link 76. In this manner the lever 70 is pivoted about the support 74, thereby urging the arms 80 forwardly to the position shown in the dotted lines in Figure 2 of the drawings, so that the trough 18 will be shifted to its vertically extending position whereby the contents of the trough will be discharged.

The conduit 14 is provided with a plurality of apertures 88 which are directed downwardly into the trough 18, so that upon actuation of the valve 66, the trough will be filled, for if the trough is shifted to its vertically extending position, the latter will be flushed out by the water jets emitting from the aperture 88.

Since it is intended that this watering system be utilized on a plurality of pens having watering troughs thereon, the actuating lever and valve are positioned intermediate the ends of the rows of pens, so that the torsional stress in the conduits will be minimized. It is therefore thought apparent that the actuating lever and connecting links must be so dimensioned as to not interfere with the conduit 14, and for this purpose the arms 80 are provided with the laterally offset extensions 84 so that when the troughs are in their vertical position, the lever 70, through the medium of the connecting link 76 and the extension 84 are utilized to forcibly lower the troughs to their horizontal position.

Further, when the lever 70 is positioned adjacent the rear sides of the pens 12, it is necessary that the pivot pin 72 must reside substantially above the axis of rotation of the conduit 64 so that the effective length of the lever 70 is greater than the effective length of the arms 80, and consequently a smaller angle of rotation of the lever necessary to produce rotation of the arms 80 through 90° to tilt the trough to its upright position. In this manner, when the lever 70 is shifted to raise the trough to its vertical position, the connecting link 76 will not engage with or interfere with the conduit 14.

From the foregoing, it is thought that the operation and construction of the device will be readily understood, and further discussion is therefore believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claims.

Having described the invention, what is claimed as new is:

1. In combination with an animal pen having a front wall, said front wall having an aperture therein, a horizontally disposed conduit rotatably mounted on said pen and extending parallel to said front wall, a basin carried by and below said conduit adjacent said aperture in said front wall, said conduit having apertures in the underside thereof for filling and rinsing said basin, and means for selectively rotating said conduit to drain water from said basin, said basin and conduit being positioned externally of said pen.

2. The combination of claim 1 including a trough carried by said basin and communicating therewith, said trough extending into said apertures in said front wall.

3. In combination with an animal pen having a front wall, said front wall having an aperture therein, a horizontally disposed conduit rotatably mounted on said pen and extending parallel to said front wall, a basin carried by and below said conduit adjacent said aperture in said front wall, said conduit having apertures in the underside thereof for filling and rinsing said basin, and means for selectively rotating said conduit to drain water from said basin, said last mentioned means including a vertically pivoted actuating lever, an arm carried by said conduit, and means operatively connecting said arm and lever.

4. The combination of claim 3 wherein said arm has a laterally offset extension thereon, said connecting means being pivoted to said extension.

5. In combination with an animal pen having a front wall, said front wall having an aperture therein, a horizontally disposed conduit rotatably mounted on said pen and extending parallel to said front wall, a basin carried by and below said conduit adjacent said aperture in said front wall, said conduit having apertures in the underside thereof for filling and rinsing said basin, and means for selectively rotating said conduit to drain water from said basin, said basin and conduit being positioned externally of said pen, a trough carried by said basin and communicating therewith, said trough extending into said aperture and abutting the upper edge of said aperture when said basin is disposed in a horizontal position.

6. In combination with an animal pen having a front wall, said front wall having an aperture therein, a horizontally disposed conduit, a plurality of brackets detachably secured to said front wall, said conduit being rotatably supported by said brackets and extending parallel to said front wall, a basin secured to the underside of said conduit adjacent said aperture in said front wall, said conduit having apertures therein facing said basin for filling and rinsing said basin, and means for selectively rotating said conduit to drain water from said basin, said basin and conduit being positioned externally of said pen, a trough carried by said basin and communicating therewith, said trough extending into said aperture and abutting the upper edge of said aperture when said basin is disposed in a horizontal position, and means rotatably connecting said conduit to a water supply line.

RALPH W. DRAKE.

REFERENCES CITED

The following references are of record in the file of this patent:

UNITED STATES PATENTS

| Number | Name | Date |
| --- | --- | --- |
| 173,033 | McIntosh | Feb. 1, 1876 |
| 455,534 | Hicks | July 7, 1891 |
| 2,471,527 | Jonas | May 31, 1949 |